United States Patent [19]

Ficken

[11] Patent Number: 4,761,708
[45] Date of Patent: Aug. 2, 1988

[54] ELECTROLYTIC SWITCH HAVING ELECTROSTATIC SHIELD

[75] Inventor: William H. Ficken, Union, N.J.

[73] Assignee: Allied-Signal Inc., Morris Township, Morris County, N.J.

[21] Appl. No.: 83,487

[22] Filed: Aug. 10, 1987

[51] Int. Cl.⁴ .............................................. H01G 00/00
[52] U.S. Cl. ................................ 361/212; 200/61.47; 200/193; 361/220
[58] Field of Search ...................... 200/61.47, 182, 185, 200/193, 194, 220, 236, 304, 305; 361/433 E, 212, 220; 337/199, 224; 338/64, 44, 80; 174/17 LF, 51; 33/350, 366, 379, 390; 74/5.6 C

[56] References Cited

U.S. PATENT DOCUMENTS

| | | | |
|---|---|---|---|
| 2,361,405 | 10/1944 | Kopple | 338/64 |
| 2,387,313 | 10/1945 | Wilson, Jr. | 174/17 LF |
| 2,713,726 | 7/1955 | Dixson | 33/366 |
| 2,720,569 | 10/1955 | Schoeppel et al. | 200/193 |
| 2,830,159 | 4/1958 | Varner | 200/220 X |
| 2,977,559 | 3/1961 | Rosenberg et al. | 200/185 X |
| 3,020,506 | 2/1962 | Remington et al. | 200/193 X |
| 3,208,023 | 9/1965 | Polye | 200/194 |
| 4,312,131 | 1/1982 | Sciffignana et al. | 33/350 |
| 4,536,967 | 8/1985 | Beitzer | 33/379 |
| 4,583,296 | 4/1986 | Dell'Acqua | 33/366 |

Primary Examiner—J. R. Scott
Attorney, Agent, or Firm—Howard G. Massung

[57] ABSTRACT

An electrolytic switch including an electrostatic shield is disclosed. The electrostatic shield is in the form of a ground plane external to the switch chamber. The ground plane bleeds off electrostatic charges which accumulate on the switch exterior and which would otherwise introduce performance errors in critical switch applications.

13 Claims, 1 Drawing Sheet

ELECTROLYTIC SWITCH HAVING ELECTROSTATIC SHIELD

BACKGROUND OF THE INVENTION

Electrolytic switches, or "bubble" switches as they are commonly known in the art, typically include a glass chamber partially filled with an electrically conductive medium or electrolyte, so that a bubble is disposed at the top of the chamber for engagement with one or more electrodes according to the orientation of the chamber. Tilting the chamber causes the bubble to shift and exposes more or less of the surface of the electrodes to the electrolyte. Switches of the type described are used in inertial instruments to control the deviation of the instruments from true vertical. In a typical implementation a plurality of electrodes are spaced about the switch chamber and the instruments are controlled by an arrangement responsive to the differential current flow through the respective electrodes as the bubble shifts in response to tilting of the instrument.

A typical prior art electrolytic switch is described in U.S. Pat. No. 2,713,727 issued to Louis Balsam on July 26, 1955. A typical switch electrolyte is described in U.S. Pat. No. 2,387,313 issued to Elwood Wilson on Oct. 23, 1945. Other electrolytic switches and implementations thereof of which the applicant is aware are described in U.S. Pat. No. 2,720,569 issued to John F. Schoeppel, et al on Oct. 11, 1955; U.S. Pat. No. 2,830,159 issued to Stuart Varner on Apr. 8, 1958; U.S. Pat. No. 2,977,559 issued to Andrew Rosenberg, et al on Mar. 28, 1961; U.S. Pat. No. 4,312,131 issued to Peter Scriffignana on Jan. 26, 1982; U.S. Pat. No. 4,536,967 issued to George Beitzer on Aug. 27, 1985; and U.S. Pat. No. 4,583,296 issued to Robert Dell'Acqua on Apr. 22, 1986.

In many current applications it has become necessary to improve the ultimate performance of the prior art switches, particularly when the switches are used in the aerospace and land navigation fields. The improved performance is required for: increased null stability, scale factor and linearity; minimization of a secondary time constant; and improved performance over an ambient temperature range, particularly at lower temperatures.

It has been found that electrostatic charges on the exterior of the switch chamber, while having a relatively small effect on electrolytic switch characteristics under most circumstances, do tend to degrade the performance of the switches when performance requirements are extended to the arc-second of angle realm. The prior art has not considered these electrostatic charges and their effect on switch performance.

This invention minimizes the effect of the aforenoted electrostatic charges by providing a ground plane on the exterior of the switch chamber for "bleeding off" said charges.

SUMMARY OF THE INVENTION

This invention contemplates an electrolytic switch including an electrostatic shield in the form of a conductive coating which provides a ground plane on the exterior of the switch. The effect of the ground plane is to "bleed off" the electrostatic charges which accumulate on the exterior of the switch, and to thus enhance switch performance as required in critical applications.

Accordingly an electrolytic switch is disclosed and claimed comprising a dielectric chamber, a plurality of electrodes disposed around the chamber, the chamber being partially filled with an electrolyte so that a bubble is formed for engagement with the electrodes commensurate with the orientation of the switch, whereby the electrodes are at different potentials, the electrolyte and the chamber being at ground potential, and electrostatic charges accumulating on the exterior of the chamber which interact with the electrolyte to affect performance of the switch, and a shield disposed on the exterior of the chamber, said shield being effective as a ground plane for bleeding off the accumulated electrostatic charges.

DETAILED DESCRIPTION OF THE INVENTION

Figure 1:
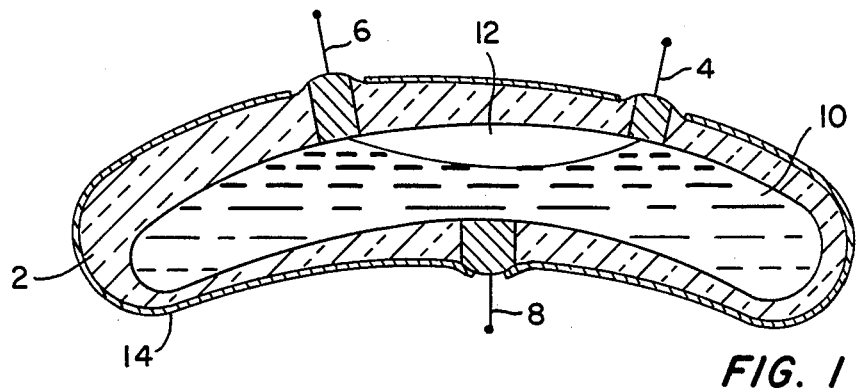
FIG. 1 is a longitudinal sectional view of an electrolytic switch incorporating the invention and illustrating one embodiment thereof.

Electrolytic switches of the type described typically include a glass chamber designated by the numeral 2. The switch has a plurality of electrodes shown, for example, as three in number and designated by the numerals 4, 6 and 8. Electrodes 4 and 6 are disposed in spaced relation on one side of chamber 2 and electrode 8 is disposed between electrodes 4 and 6 and on the other side of the chamber.

Chamber 2 is partially filled with an electrolyte 10 such as described in the aforenoted U.S. Pat. No. 2,387,313, and which forms a conductive path between electrodes 6 and 8 and between electrodes 4 and 8. Due to the partial filling of chamber 2 with electrolyte 10, a bubble 12 is formed within chamber 2. In the arrangement shown, electrode 8 is at a potential which is the average of the potentials of the three electrodes 4, 6 and 8, and hence is most near the potential of electrolyte 10, which is at ground potential.

When bubble 12 is centered, the resistance between electrodes 6 and 8 is equal to the resistance between electrodes 4 and 8. This condition is indicative of the true verticality of a utilizing inertial instrument. When suitably implemented as by an electrical bridge circuit or the like the switch output is zero.

As switch 2 tilts with a deviation from true verticality of the utilizing inertial instrument, this resistance changes. Thus, electrodes 4 and 6 may be more or less covered by bubble 12, as the case may be, wherein one of said electrodes has a decreased resistance and the other electrode has an increased resistance. This unbalances the aforenoted electrical bridge circuit and a switch output results.

It has long been known that the center of bubble 12 is not only a function of a gravity vector, as when the utilizing inertial instrument is tilted from true vertical, but also is a function of surface energy forces which produce the curvature configuration of the bubble. It is also known that this surface energy is sensitive to extreme temperature gradients.

Further, it is known that static charges can be developed on the surface of a dielectric material such as that of chamber 2 (glass), and that a known and predictable charge is present whenever two particles of matter are charged to different potentials and are separated by a dielectric, as in the present case. In this regard, reference is made to *The Standard Handbook For Electrical Engineers*, 12th Edition, by Donald C. Fink, published by McGraw-Hill and Co. New York, N.Y., 1986, at Sec. 2-109.

The present invention acknowledges that these charges, although small, do exist with sufficient magnitude to introduce significant and measurable errors in the performance of electrolytic switches in applications where arc-second of angle must be accommodated. In this regard it should be considered that since electrolyte 10 and the interior of glass chamber 2 are at ground potential, chamber 2, being a good dielectric, allows electrostatic charges to accumulate on its exterior which interact with electrolyte 10 to degrade switch performance. These electrostatic charges affect the null stability, scale factor, linearity and secondary time constant of the switch.

For example, for the same charge in the vicinity of electrodes 4 and 6 the increased glass thickness in the vicinity of electrode 6, which is a function of the manufacture of the switch, reduces the electrostatic charge inversely with the square of the thickness of the glass. This shifts the electrical null of the switch in an inverse square manner, and thus has a detrimental affect on switch linearity.

For a different charge in the vicinity of electrodes 4 and 6 differential forces can likewise cause a null shift. As forces on electrolyte 10 and resulting opposing forces on the electrostatic charge vary with switch orientation, and considering that the electrostatic charge takes time to accumulate on the surface of glass chamber 2, it will be readily understood that an undesirable secondary time constant is introduced.

The present invention minimizes the aforenoted electrostatic forces by providing a ground plane 14 on the exterior of glass chamber 2. This ground plane acts as a shield and is implemented as a conductive coating on the exterior of chamber 2. In the embodiment of the invention shown in FIG. 1, ground plane 14 is connected to one electrode, such as electrode 8. In this regard it will be understood that ground plane or shield 14 can be connected to either of the other electrodes, but is preferably connected to electrode 8 which is at an average potential of the three electrodes and, hence, is most near the ground potential of electrolyte 10, as aforenoted.

In the preferred embodiment of the invention the conductive coating is a suitable dispersion of colloidal graphite such as marketed by Achison Colloids, Inc., Port Huron, Mich., under the registered trademark ELECTRODAG.

ELECTRODAG 154, which is the product actually used, is an easy-to-apply coating made from a dispersion of colloidal graphite in an isopropanol solution which quickly air dries on the applied surface to form a thin, uniform adherent layer. Typical applications include static bleeding, bleed paths and shielding. The properties and other characteristics of the product are listed on a Product Data Sheet for ELECTRODAG 154 published by Acheson Colloids Company.

The effect of ground plane 14 is to bleed off the electrostatic charges which have accumulated on the outside of glass chamber 2 and to thereby minimize the effect that said charges have on the performance of the electrolytic switch.

Figure 2:
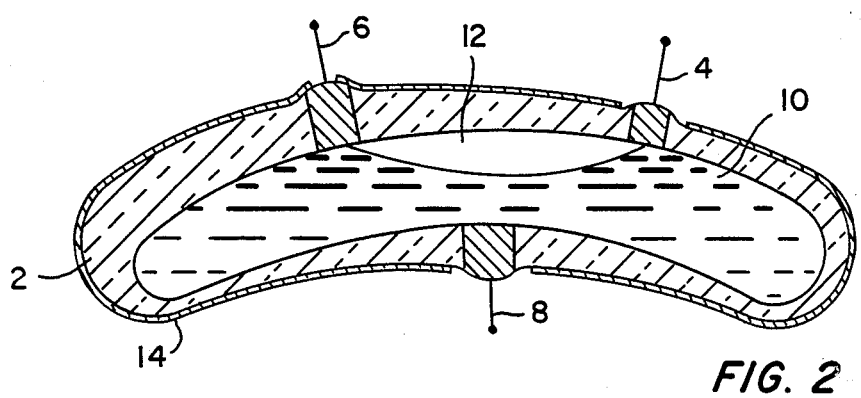
FIG. 2 is a longitudinal sectional view illustrating another embodiment of the invention.
Figure 3:
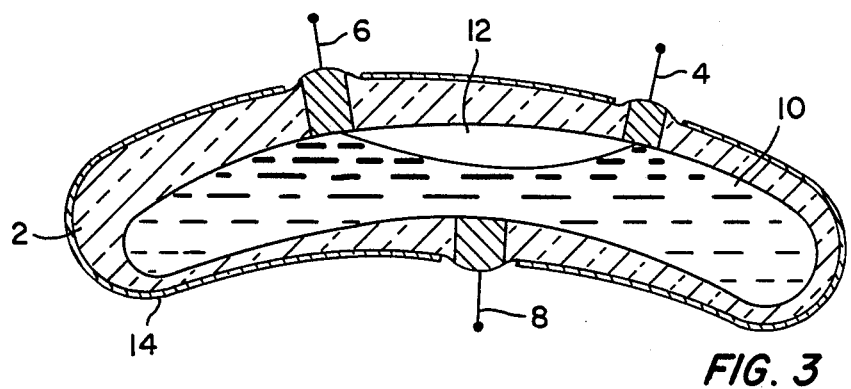
FIG. 3 is a longitudinal sectional view illustrating yet another embodiment of the invention.

While FIG. 1 shows ground plane 14 preferably connected to electrode 8 for the reasons aforenoted, the connection may be to any of the other electrodes such as electrode 6 as shown in FIG. 2. Indeed, ground plane 14 need not be connected to any of the electrodes, as shown in FIG. 3, and the required bleeding of the electrostatic charges will still occur, as will be readily understood.

In effect, then, the present invention provides an electrostatic shield on the exterior of chamber 2. This electrostatic shield desensitizes the electrolytic switch from the affect of electrostatic charges on the switch characteristics. This effect is manifested in improved null stability, scale factor and linearity, and in a minimization of a secondary time constant associated with the switch performance over an ambient temperature range, particularly in the lower temperature areas, is achieved.

With the above description of the invention in mind, reference is made to the claims appended hereto for a definition of the scope of the invention.

What is claimed is:

1. An electrolytic switch, comprising:
   a dielectric chamber;
   a plurality of electrodes disposed around the chamber;
   the chamber being partially filled with an electrolyte so that a bubble is formed within the chamber for engagement with the electrodes commensurate with the orientation of the switch, whereby the electrodes are at different potentials;
   the electrolyte and the chamber interior being at ground potential, and electrostatic charges accumulating on the exterior of the chamber which interact with the electrolyte to affect the performance characteristics of the switch; and
   a shield disposed on the exterior of the chamber, said shield being effective as a ground plane for bleeding off the accumulated electrostatic charges.

2. An electrolytic switch as described by claim 1, wherein:
   the shield disposed on the exterior of the chamber is a conductive coating.

3. An electrolytic switch as described by claim 2, wherein:
   the conductive coating is connected to one electrode of the plurality of electrodes.

4. An electrolytic switch as described by claim 3, wherein:
   the conductive coating is connected to the one electrode of the plurality of electrodes at a potential most near the ground potential of the electrolyte and the chamber interior.

5. An electrolytic switch as described by claim 4, wherein:
   the plurality of electrodes includes a first and a second electrode on one side of the chamber and a third electrode on the opposite side of the chamber between the first and second electrodes;
   the bubble engages the first and second electrodes commensurate with the orientation of the switch, whereby the first, second and third electrodes are at different potentials, with the third electrode being at the potential most near the ground potential of the electrolyte and the chamber interior; and
   the conductive coating is connected to the third electrode.

6. An electrolytic switch as described by claim wherein:
  the plurality of electrodes includes a first and a second electrode on one side of the chamber and a third electrode on the opposite side of the chamber between the first and second electrodes;
  the bubble engages the first and second electrodes commensurate with the orientation of the switch, whereby the first, second and third electrodes are at different potentials, and
  the conductive coating is connected to one of the first, second and third electrodes.

7. An electrolytic switch as described by claim 2, wherein:
  the conductive coating is connected to none of the plurality of electrodes.

8. An electrolytic switch as described by claim 2, wherein the conductive coating includes:
  a dispersion of colloidal graphite in an isopropanol solution which dries to a thin uniform adherent layer.

9. An electrolytic switch of the type including a dielectric chamber, a plurality of electrodes disposed around the chamber, the chamber being partially filled with an electrolyte so that a bubble is formed within the chamber for engagement with the electrodes commensurate with the orientation of the switch, whereby the electrodes are at different potentials, the electrolyte and the chamber interior being at ground potential, and electrostatic charges accumulating on the exterior of the chamber which interact with the electrolyte to affect the performance characteristics of the switch, the improvement comprising:
  a shield disposed on the exterior of the chamber, said shield being effective as a ground plane for bleeding off the accumulated electrostatic charges.

10. An electrolytic switch, comprising:
  a dielectric chamber;
  a plurality of electrodes disposed around the chamber;
  the chamber being partially filled with an electrolyte so that a bubble is formed within the chamber for engagement with the electrodes commensurate with the orientation of the switch, whereby the electrodes are at different potentials, with one of the electrodes being at a potential most near ground potential;
  the electrolyte and the chamber interior being at ground potential, and electrostatic charges accumulating on the exterior of the chamber which interact with the electrolyte to affect the performance characteristics of the switch; and
  a conductive shield disposed on the exterior of the chamber and connected to the one electrode, with said shield being thereby effective as a ground plane for bleeding off the accumulated electrostatic charges.

11. An electrolytic switch as described by claim 10, wherein:
  the conductive shield disposed on the exterior of the chamber is a conductive coating.

12. An electrolytic switch as described by claim 10, wherein:
  the plurality of electrodes includes a first and a second electrode on one side of the chamber and a third electrode on the opposite side of the chamber between the first and second electrodes;
  the bubble engages the first and second electrodes commensurate with the orientation of the switch, whereby the first, second and third electrodes are at different potentials, with the third electrode being at the potential most near ground potential; and
  the conductive shield is connected to the third electrode.

13. An electrolytic switch as described by claim 11, wherein the conductive coating includes;
  a dispersion of colloidal graphite in an isopropanol solution which dries to a thin uniform adherent layer.

* * * * *